US007689303B2

(12) United States Patent
Ziep et al.

(10) Patent No.: US 7,689,303 B2
(45) Date of Patent: Mar. 30, 2010

(54) DATA TRANSFER IN AUDIO CODEC CONTROLLERS

(75) Inventors: Norbert Ziep, Dresden (DE); Thomas Berndt, Radebeul (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1856 days.

(21) Appl. No.: 10/259,716

(22) Filed: Sep. 27, 2002

(65) Prior Publication Data

US 2003/0204276 A1 Oct. 30, 2003

(30) Foreign Application Priority Data

Apr. 30, 2002 (DE) ................................ 102 19 357

(51) Int. Cl.
*G06F 17/00* (2006.01)
*G06F 13/00* (2006.01)

(52) U.S. Cl. .............................. 700/94; 710/54; 710/33

(58) Field of Classification Search ......... 704/500–504; 710/52, 54; 712/35, 220; 700/94; 341/144; 370/465; 375/260

See application file for complete search history.

(56) References Cited

U.S. PATENT DOCUMENTS

| | | | | |
|---|---|---|---|---|
| 5,857,083 | A | 1/1999 | Venkat | |
| 6,016,472 | A * | 1/2000 | Ali | 704/500 |
| 6,216,107 | B1 * | 4/2001 | Rydbeck et al. | 704/500 |
| 6,389,033 | B1 * | 5/2002 | Maxwell et al. | 370/438 |
| 6,584,144 | B2 * | 6/2003 | Alamouti et al. | 375/147 |
| 6,628,999 | B1 * | 9/2003 | Klaas et al. | 700/94 |
| 6,629,001 | B1 * | 9/2003 | Vadivelu | 700/94 |
| 6,633,582 | B1 | 10/2003 | Panburana et al. | |
| 6,642,876 | B2 * | 11/2003 | Subramoniam et al. | 341/144 |
| 6,661,848 | B1 | 12/2003 | Smith et al. | |
| 6,731,723 | B1 * | 5/2004 | Garey | 379/88.1 |
| 6,748,472 | B2 * | 6/2004 | Knudsen | 710/260 |

(Continued)

FOREIGN PATENT DOCUMENTS

| | | |
|---|---|---|
| DE | 69702336 | 2/1996 |
| EP | 0882286 | 6/2000 |

OTHER PUBLICATIONS

Wolfson WM9703 Production Data, Jan. 2001, Wolfson Microelectronics Ltd, Rev 3.4, 30 pages.*

(Continued)

*Primary Examiner*—Vivian Chin
*Assistant Examiner*—Joseph Saunders, Jr.
(74) *Attorney, Agent, or Firm*—Meyertons, Hood, Kivlin, Kowert & Goetzel, P.C.

(57) ABSTRACT

An audio codec control technique is provided with improved multichannel data ordering capabilities. An audio codec controller comprises a first interface unit for performing data transfer to and from an audio codec, a second interface unit for performing data transfer from an external memory, and a data buffer for buffering data received from the external memory via the second interface unit. The controller further comprises a capture register for receiving from the data buffer data requested by the audio codec, and temporarily storing the received data. The first interface unit is connected to receive temporarily stored data from the capture register. The operation of the audio codec controller may be done in several operational modes including 2, 4, and 6-channel full-rate and half-rate modes.

69 Claims, 6 Drawing Sheets

U.S. PATENT DOCUMENTS

| | | | | |
|---|---|---|---|---|
| 6,757,659 | B1 * | 6/2004 | Tanaka et al. | 704/501 |
| 2001/0022787 | A1 * | 9/2001 | Mchale | 370/442 |
| 2002/0038158 | A1 * | 3/2002 | Hashimoto et al. | 700/94 |
| 2002/0133356 | A1 * | 9/2002 | Romesburg | 704/500 |

OTHER PUBLICATIONS

Intel 82801AA (ICH) and Intel 82801AB (ICHO) I/O Controller Hub Datasheet, Jun. 1999, Intel Corporation, pp. i, ii, and 5-108—5-115.*

* cited by examiner

| Slot number | 0 | 1 | 2 | 3 | 4 | 5 | 6 | 7 | 8 | 9 | 10 | 11 | 12 |
|---|---|---|---|---|---|---|---|---|---|---|---|---|---|
| Frame n | TAG | CMD ADDR | CMD DATA | X | X | O | X | X | X | X | O | O | GPIO |
| Frame n+1 | TAG | CMD ADDR | CMD DATA | X | X | O | X | X | X | X | O | O | GPIO |
| Frame n+2 | TAG | CMD ADDR | CMD DATA | X | X | O | X | X | X | X | O | O | GPIO |

*Fig. 8*

| Slot number | 0 | 1 | 2 | 3 | 4 | 5 | 6 | 7 | 8 | 9 | 10 | 11 | 12 |
|---|---|---|---|---|---|---|---|---|---|---|---|---|---|
| Frame n | TAG | CMD ADDR | CMD DATA | X | O | O | X | X | O | O | O | O | GPIO |
| Frame n+1 | TAG | CMD ADDR | CMD DATA | O | X | O | O | O | X | X | O | O | GPIO |
| Frame n+2 | TAG | CMD ADDR | CMD DATA | X | O | O | X | X | O | O | O | O | GPIO |

*Fig. 9*

DATA TRANSFER IN AUDIO CODEC CONTROLLERS

BACKGROUND OF THE INVENTION

1. Field of the Invention

The invention generally relates to audio codec controllers such as AC (Audio Codec) '97 controllers, and in particular to the data transfer between such controllers and an audio codec.

2. Description of the Related Art

Present computer systems such as personal computers are usually provided with audio capabilities and include sound cards and speakers. PC (Personal Computer) audio hardware and applications are advancing fast, and there are a lot of fascinating new applications, including 3D gaming with positional audio, DVD playback, internet telephony, voice-recognition software, and so on. Many of these new applications require expensive sound cards while other applications can be used with low cost hardware.

Many motherboards include a specific sound chip on-board for providing built in audio capabilities. Other motherboards can provide such functionality without requiring the provision of a specific integrated circuit chip that does all the audio signal processing. Instead, such motherboards may include circuitry in compliance with the AC '97 specification. The AC '97 functionality may be performed by the chipset on the motherboard, e.g. by a southbridge device.

The AC '97 specification defines an audio codec architecture and digital interface which is specifically designed for implementing audio and modem I/O functionality in mainstream PC systems. In such architecture, an interface is provided that allows audio data to be processed in a rather inexpensive additional chip which includes an analog-to-digital converter together with some additional analog circuits. The real audio data processing is however done by the CPU (Central Processing Unit) of the computer system. An AC '97 architecture is shown in FIG. 1. The system includes an audio codec controller 110 which is also referred to as digital controller hereafter, and a set of, e.g., two codecs 180, 190. The codecs 180, 190 may be located on a circuit board or card 120, and there may be a primary codec 180 and a secondary codec 190. The codecs may be audio codecs, modem codecs, or combined audio/modem codecs, and both codecs 180, 190 may be provided in one or two physically separate integrated circuit chips.

The codecs 180, 190 perform digital-to-analog and analog-to-digital conversion, mixing, and analog I/O for audio (or modem) purposes, and always function as slaves to the audio codec controller 110. The controller is typically either a PCI (Peripheral Component Interconnect) accelerator or a controller that comes integrated within core logic chipsets. The digital link that connects the audio codec controller 110 to the codecs 180, 190 is a bi-directional, 5-wire, serial TDM (Time Division Multiplexing) format interface, referred to as AC-link. The AC-link supports connections between a single audio codec controller 110 and up to four codecs 180, 190.

The audio codec controller 110 is further connected to the host memory 100 of the computer system, e.g. by means of a PCI bus. In the audio codec controller 110, there are respective interface controllers 130, 140 for controlling the data transfer at both interfaces. That is, the digital controller 110 comprises a bus master controller 130 and an AC-link interface controller 140.

As can be seen from FIG. 1, the audio codec controller 110 further comprises an input FIFO (first-in-first-out) buffer 150 and an output FIFO buffer 160 which are controlled by the FIFO controller 170. The buffers 150, 160 store data relating to one of the two independent data streams of the incoming and outgoing traffic. That is, the bus master controller 130 accesses the host memory 100 to receive audio data needed by one of the codecs 180, 190. The received data are stored in the output FIFO buffer 160 and are there made available to the AC-link interface controller 140 to be sent to the codec 180, 190. The input FIFO buffer 150 performs the corresponding function with respect to the data stream which originates at the codecs 180, 190.

In such audio sub-systems, there may be more than two channels in use. Particularly in 6-channel configurations, there may be separate channels for audio left-front, right-front, left-rear, right-rear, center-front, and subwoofer. In such cases, the handling of the output FIFO buffer 160 by FIFO controller 170 becomes rather difficult, and in particular the AC-link interface controller 140 needs to be provided with complicated hardware circuitry for accessing the output FIFO buffer 160 when building the serial data for the AC-link. This may lead to significant circuit development and manufacturing costs.

SUMMARY OF THE INVENTION

An improved audio codec control technique is provided where the data transfer in particular in audio multichannel conditions may be done more efficient and reliable.

In one embodiment, an audio codec controller is provided that comprises a first interface unit for performing data transfer to and from an audio codec, a second interface unit for performing data transfer from an external memory, and a data buffer for buffering data received from the external memory via the second interface unit. The audio codec controller further comprises a capture register for receiving from the data buffer data requested by the audio codec, and temporarily storing the received data. The first interface unit is connected to receive temporarily stored data from the capture register.

In another embodiment, an integrated circuit chip is provided that has audio codec control functionality. The integrated circuit chip comprises first interface circuitry for performing data transfer to and from an audio codec, second interface circuitry for performing data transfer from an external memory, and a data buffer for buffering data received from the external memory via the second interface circuitry. The integrated circuit chip further comprises a capture register for receiving from the data buffer data requested by the audio codec, and temporarily storing the received data. The first interface circuitry is connected to receive temporarily stored data from the capture register.

In a further embodiment, there may be provided an audio codec control method. The method comprises receiving data from an external memory, buffering the receiving data in a data buffer, temporarily storing buffered data in a capture register in accordance with a request from an audio codec, and transferring temporarily stored data from the capture register to the audio codec independent of an operation of the data buffer.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein:

FIG. 8 illustrates a sequence of data frames on the AC-link in a full-rate 6-channel configuration;

FIG. 9 illustrates a sequence of data frames on the AC-link in a half-rate 6-channel configuration;

DETAILED DESCRIPTION OF THE INVENTION

The illustrative embodiments of the present invention will be described with reference to the figure drawings wherein like elements and structures are indicated by like reference numbers.

Figure 1:
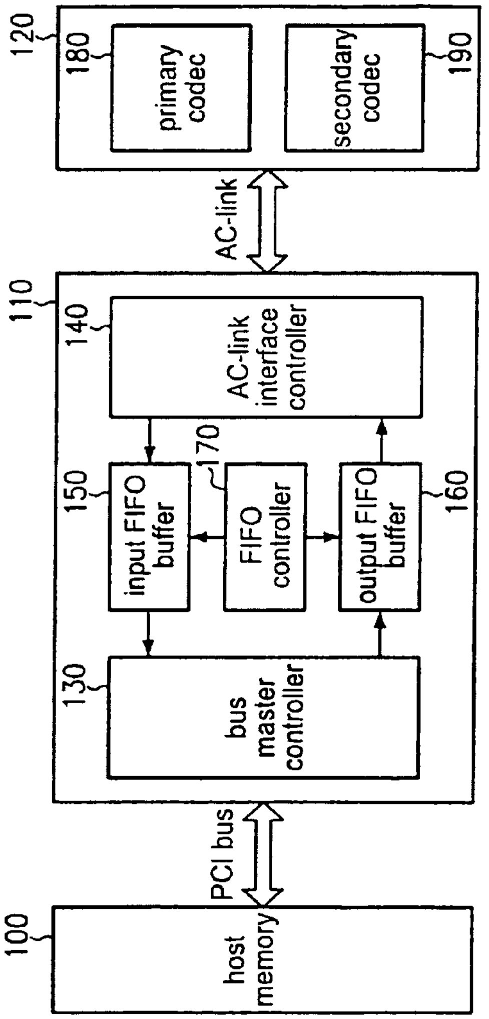
Fig. 1 (Prior Art)
FIG. 1 is a system diagram illustrating the components of a conventional AC '97 system.
Figure 2:
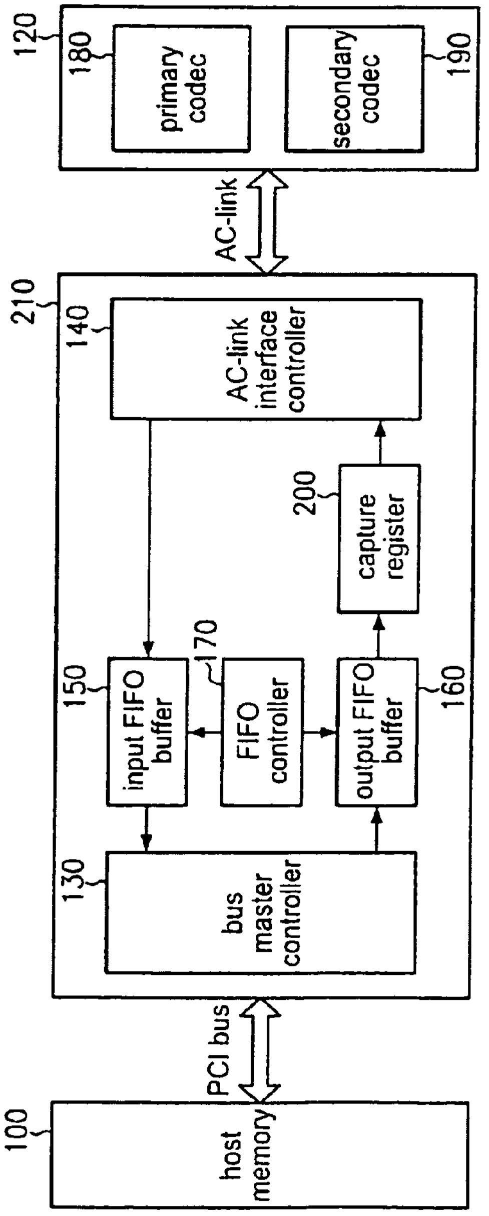
FIG. 2 is a system diagram illustrating an AC '97 compliant system according to an embodiment.

Referring now to the drawings and particularly to FIG. 2 which illustrates an audio system according to an embodiment, the system differs from that of FIG. 1 mainly in that a capture register 200 is provided in the audio-out data path. The capture register 200 is connected to the output FIFO buffer 160 to receive from the buffer data that were previously requested by one of the codecs 180, 190. Further, the capture register 200 is connected to AC-link interface controller 140 to supply data that is temporarily stored in the capture register 200, to the interface controller 140. Thus, without requiring to modify the FIFO controller 170, the provision of the capture register 200 may allow to efficiently perform a packet-oriented data transfer on the AC-link while still controlling the output FIFO buffer 160 on a sample-oriented basis. This will become more apparent from the more detailed description below showing examples of operational modes and operation methods in the audio codec controller 210 of FIG. 2.

Several configurations of the audio sub-system of the present embodiment are possible for performing audio traffic as 2, 4 or 6-channel data stream. In the 2-channel mode, the primary codec 180 has two channels while a secondary codec 190 is either not existent or is in an idle mode. In the 4-channel version, the primary codec 180 may have four channels with the secondary codec 190 being not existent or idle. Alternatively, the primary codec 180 as well as the secondary codec 190 may each have two channels. Likewise, two different 6-channel versions may exist, one where the primary codec 180 has two channels and the secondary codec 190 four channels, and the other where the primary codec 180 has four channels and the secondary codec 190 two channels.

The output FIFO buffer 160 may be sub-divided into six buffer units, each for storing data relating to one of the possible audio-out channels: left-front, right-front, left-rear, right-rear, center-front, and subwoofer. Alternatively, the output FIFO buffer 160 may store data received from the host memory 100 in much the same way as the data were stored in the host memory 100. In the present embodiment, the output FIFO buffer 160 stores one sample for each channel, where a sample is represented by a word of 16 bits. As the audio codec controller 210 of the present embodiment supports 2, 4 and 6-channel configurations, the number of channels is even at any time so that any access to the output FIFO buffer 160 may be done in a double word manner. As one word represents one sample, the output FIFO buffer 160 is accessed on a sample-oriented basis. For the example of a 6-channel configuration, the following table shows the kind of capturing the data samples in the host memory 100 and the output FIFO buffer 160:

| | |
|---|---|
| sample 2 | sample 1 |
| sample 4 | sample 3 |
| sample 6 | sample 5 |
| sample 2 | sample 1 |
| sample 4 | sample 3 |
| sample 6 | sample 5 |

When preparing for the data transfer over the AC-link, the samples need to be reordered since the assignment of samples to time slots in the serial data stream to the codecs 180, 190 may differ from one multi-channel configuration to another one. An example of respective sample orders is shown in the table below:

| audio channel | timeslot | 2-channel configuration | 4-channel configuration | 6-channel configuration |
|---|---|---|---|---|
| left front | 3 | 1 | 1 | 1 |
| right front | 4 | 2 | 2 | 2 |
| center front | 6 | | | 3 |
| left rear | 7 | | 3 | 5 |
| right rear | 8 | | 4 | 6 |
| subwoofer | 9 | | | 4 |

As apparent therefrom, for a given 2, 4 or 6-channel audio stream the audio bus master controller 130 expects each sample compound to start with the left-front sample. However, the sample order then depends on the specific channel configuration. By providing the capture register 200, any possible data ordering requirement can be easily accomplished in the different multi-channel applications, and the packet-oriented data transfer on the AC-link can be performed simply by multiplexing the temporarily stored, consistent data with respect to the time slots.

Figure 3:
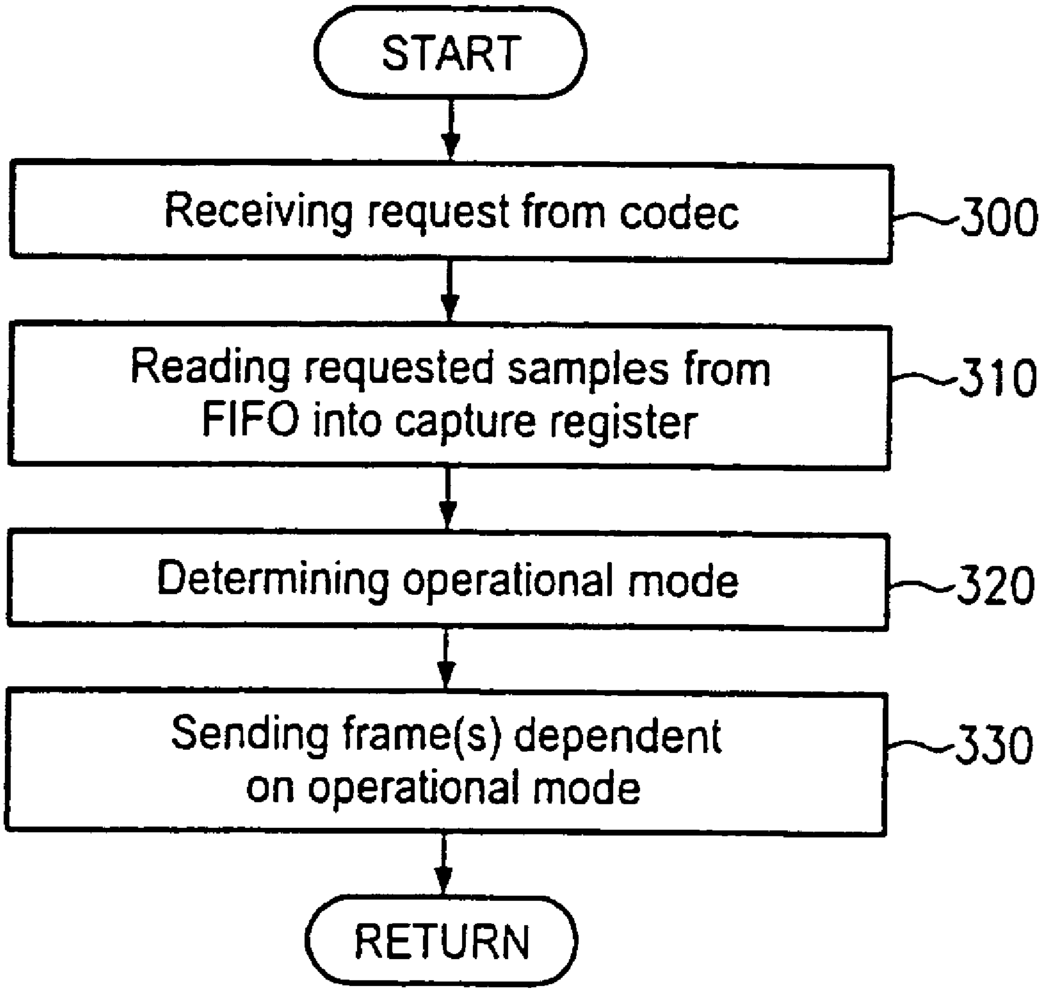
FIG. 3 is a flowchart illustrating the main process of performing an audio-out data transfer according to an embodiment.

Turning now to FIG. 3, the main process of performing the audio-out data transfer is depicted. In step 300, the audio codec controller 210 receives a request from the primary or an (optional) secondary codec 180, 190 for audio samples. The requested samples are then read from the output FIFO buffer 160 into the capture register 200 (step 310). Finally, the samples are sent to the codec in step 330.

As apparent from flowchart of FIG. 3, there may be different operational modes which may influence the manner of how the requested data is sent to the codec. These operational modes may be a variable sample mode, a down sample mode etc. Moreover, the operational modes may be transfer modes differing in the number of supported channels or transfer rates. Then, the output FIFO buffer 160 may buffer the data received from the host memory 100 in at least two different configurations, where each configuration relates to one of the data transfer modes. The output FIFO buffer 160 may further buffer groups of audio data samples where the number of audio data samples in each group corresponds to the number of supported audio channels. Additionally, the sample pairs (double words) for the left-front/right-front, center-front/sub-woofer, and left-rear/right-rear channels can be swapped each other by programming.

As the audio codec controller 210 of the present embodiment may be operated in different operational modes, the process depicted in FIG. 3 includes a step 320 of determining the operational mode, and the sending step 330 is performed dependent on the determined mode.

In another embodiment, the operational mode is loaded and configured by the driver at the very beginning of the process. Moreover, the step 320 of determining the operational mode may be performed before step 310 of reading the requested samples from the output FIFO buffer 160 into the capture register 200. This allows for even making step 310 dependent on the determined operational mode.

An example of how the sending of samples over the AC-link may be done dependent on an operational mode, will now be discussed with reference to FIGS. 4 to 9.

Figure 4:
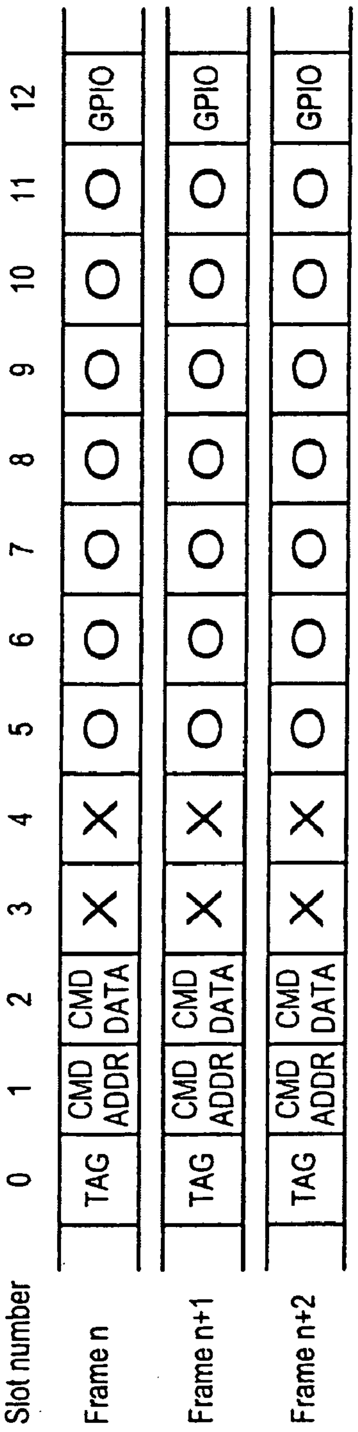
FIG. 4 illustrates a sequence of data frames on the AC-link in a full-rate 2-channel configuration.
Figure 5:
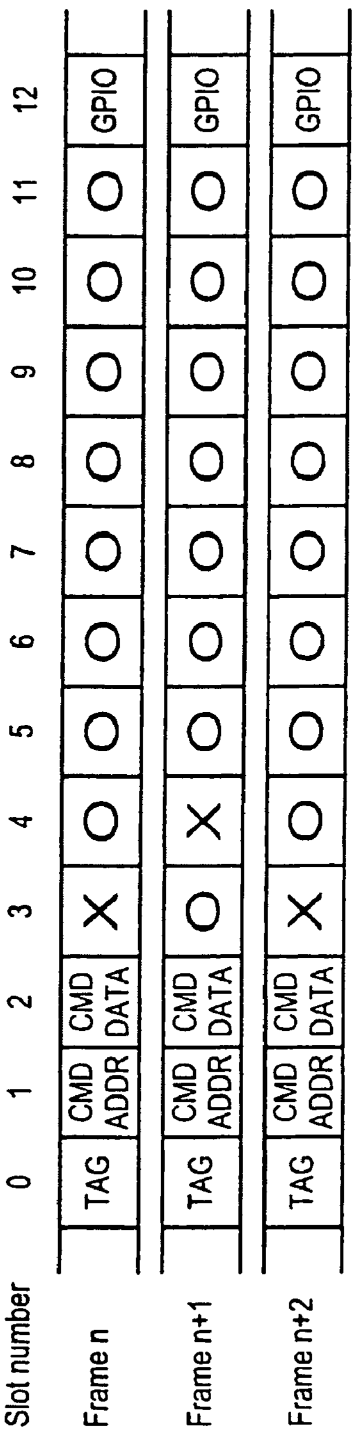
FIG. 5 illustrates a sequence of data frames on the AC-link in a half-rate 2-channel configuration.
Figure 6:
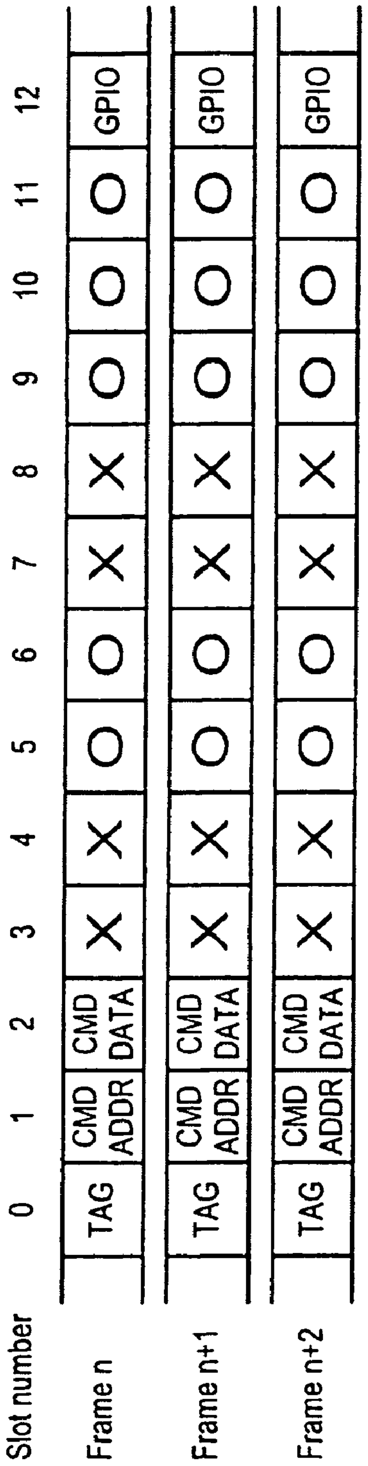
FIG. 6 illustrates a sequence of data frames on the AC-link in a full-rate 4-channel configuration.
Figure 7:
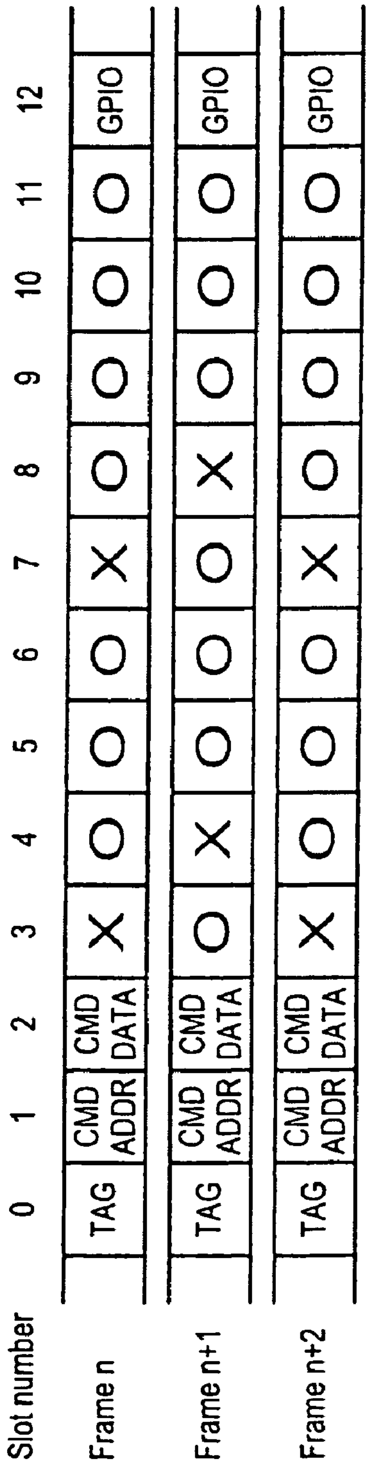
FIG. 7 illustrates a sequence of data frames on the AC-link in a half-rate 4-channel configuration.

In these, figures, data transfer modes that differ in the supported transfer rates, are applied in 2, 4 and 6-channel configurations. In the full-rate transfer mode, all of the samples are sent in one frame. In the half-rate transfer mode, two frames are used with the left-front, center-front, and left-rear samples being transferred in one frame and the right-front, right-rear, and subwoofer samples being transferred in the following frame. In detail, FIG. 4 illustrates the case of 2-channel configuration where the data is transferred in full-rate mode. FIG. 5 is the corresponding diagram illustrating the half-rate mode, and FIGS. 6 and 7, and 8 and 9 relate to the 4-channel and 6-channel configurations, respectively.

In the example of half-rate data transmissions, the capture register 200 is filled from the output FIFO buffer 160 with the audio samples of all channels of the respective configuration. The AC-link interface controller 140 is however caused to access the capture register 200 twice, for partially transferring the temporarily stored data in one frame, and then transferring the remaining samples in the following frame. That is, the capture register 200 allows a packet-oriented data transfer over the AC-link independent on the operation of the output FIFO buffer 160.

In the present embodiment, the AC-link interface controller 140 further allows for sending one-word, i.e. 16-bit, samples via the serial AC-link although the time slots are 20 bits wide. In this case, the 16-bit samples are transferred as the 16 most significant bits of each 20 bit slot, with the low order bits discarded for incoming data and filled with zeros for output data. Moreover, if there is an optional secondary codec 190 provided in the system, the AC-link interface controller 140 may assign input slots in a completely orthogonal manner, i.e. no two data slots at the same location will be valid on both codec signals.

Figure 10:
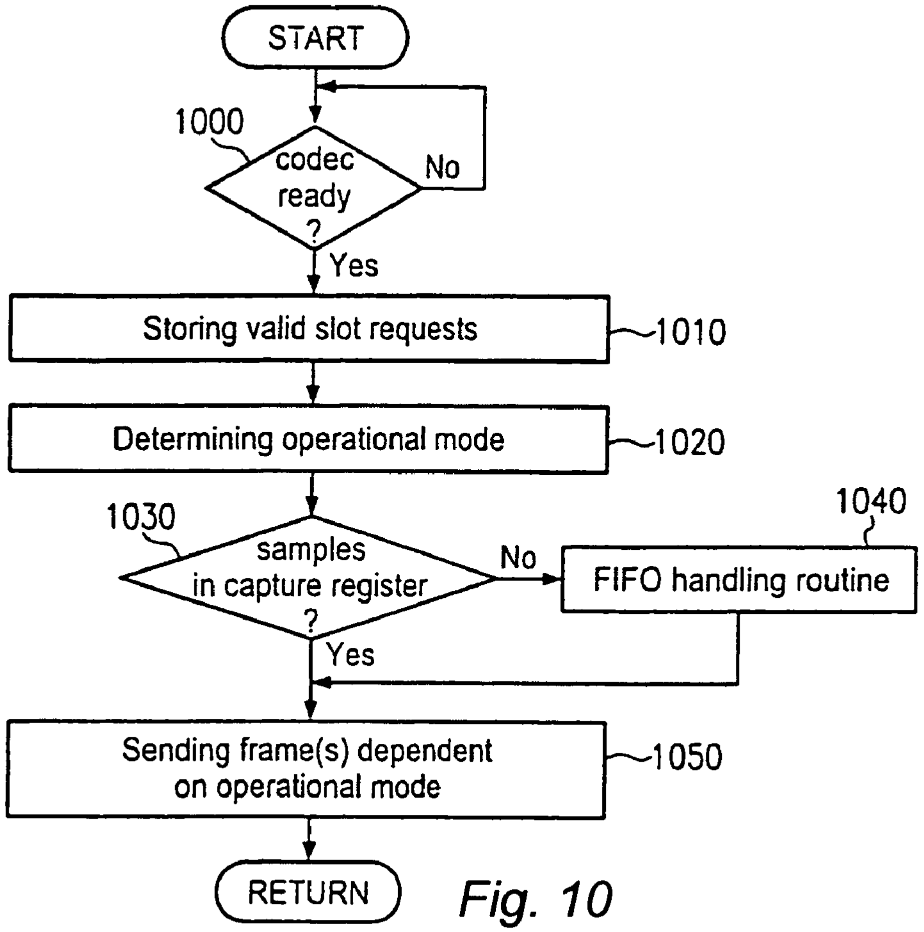
FIG. 10 is a flowchart illustrating the process of operating an audio codec controller according to an embodiment.

Turning now to FIG. 10, another embodiment of operating the audio codec controller 210 is depicted. In step 1000, the controller 210 checks whether the codec 180, 190 is ready. If so, the valid slot requests are stored in step 1010 and the operational mode is determined in step 1020. It is then checked in step 1030 whether samples are present in the capture register 200. If no samples are present, a FIFO handling routine 1040 is performed for refilling the capture register 200. Finally, one or more frames are sent to the codec 180, 190 dependent on the operational mode which was previously determined (step 1050).

While the FIFO handling routine 1040 is depicted in the flowchart of FIG. 10 as being performed directly before sending the frames, the FIFO handling may also be done completely independently from the process shown in FIG. 10. Moreover, the FIFO handling routine may include a buffer under-run policy that guarantees that existing data will be held until the new data is available. Thus, for each new packet requested from the codec 180, 190, a defined and stable data status is achievable without any data corruption and inconsistency for the codec.

Figure 11:
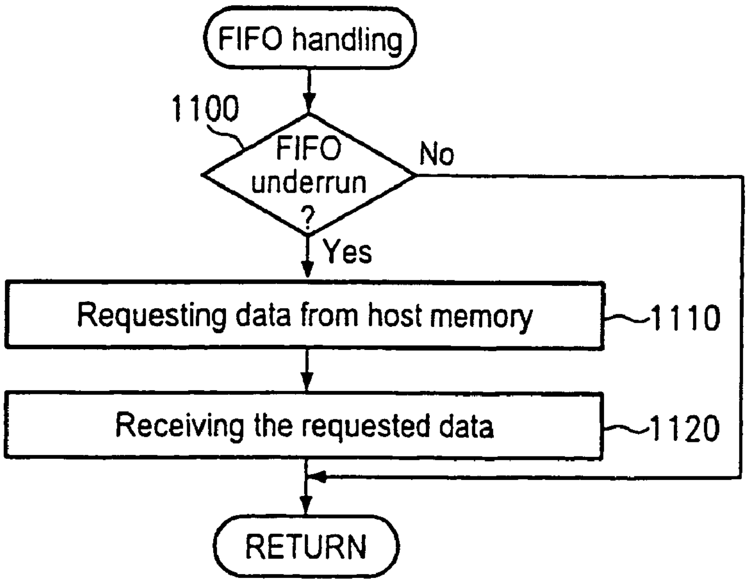
FIG. 11 is a flowchart illustrating an example of the FIFO handling performed in the process of FIG. 10.

FIG. 11 shows an example of a FIFO handling routine. In step 1100, the FIFO controller 170 determines whether the output FIFO buffer 160 has entered an under-run condition. If so, the bus master controller 130 requests new data from host memory 100 (step 1110), and the requested data is received in step 1120.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. An audio codec controller comprising:

a first interface unit configured to perform data transfer to and from an audio codec;

a second interface unit configured to perform data transfer from an external memory; and a data buffer configured to buffer audio samples received from said external memory via said second interface unit, wherein said audio codec controller further comprises:

a capture register coupled to receive from said data buffer audio samples requested by said audio codec, and configured to temporarily store the received audio samples, wherein said first interface unit is connected to receive temporarily stored audio samples from said capture register in a sample order different from the order of the audio samples received from the external memory, wherein the second interface is configured to transfer a first audio sample to the capture register and to subsequently transfer a second audio sample to the capture register, and wherein the first interface is configured to receive the second audio sample from the capture register and subsequently receive the first audio sample from the capture register.

2. The audio codec controller of claim 1, wherein said first interface unit is arranged for accessing said capture register at least twice to receive the temporarily stored audio samples without requiring said data buffer to be refilled from said external memory.

3. The audio codec controller of claim 2, wherein said data transfer to said audio codec includes the transfer of frames, and said first interface unit is arranged for transferring said audio samples received upon accessing said capture register at least twice, to said audio codec in at least two frames.

4. The audio codec controller of claim 1, wherein the data transfer to said audio codec is a packet oriented data transfer while the data transfer from said external memory is an audio sample oriented data transfer.

5. The audio codec controller of claim 1, wherein said data transfer to said audio codec is a multi-channel audio data transfer.

6. The audio codec controller of claim 5, wherein said multi-channel audio data transfer includes data transfer relating to a left-front channel and a right-front channel.

7. The audio codec controller of claim 5, wherein said multi-channel audio data transfer includes data transfer relating to a left-rear channel and a right-rear channel.

8. The audio codec controller of claim 5, wherein said multi-channel audio data transfer includes data transfer relating to a center-front channel.

9. The audio codec controller of claim 5, wherein said multi-channel audio data transfer includes data transfer relating to a subwoofer channel.

10. The audio codec controller of claim 5, wherein said multi-channel audio data transfer is a 2-channel data transfer relating to a left-front channel and a right-front channel.

11. The audio codec controller of claim 5, wherein said multi-channel audio data transfer is a 4-channel data transfer relating to a left-front channel, a right-front channel, a left-rear channel, and a right-rear channel.

12. The audio codec controller of claim 5, wherein said multi-channel audio data transfer is a 6-channel data transfer relating to a left-front channel, a right-front channel, a left-rear channel, a right-rear channel, a center-front channel, and a subwoofer channel.

13. The audio codec controller of claim 5, wherein said multi-channel audio data transfer includes the transfer of frames having time slots, and each channel is assigned one of said time slots.

14. The audio codec controller of claim 1, being operable in at least two different operational modes.

15. The audio codec controller of claim 14, wherein said at least two operational modes relate to different data transfer modes of the data transfer to said audio codec.

16. The audio codec controller of claim 15, wherein said data transfer modes differ in the number of supported audio channels.

17. The audio codec controller of claim 16, wherein said data buffer is arranged for buffering the data received from said external memory in at least two different configurations, each configuration relating to one of said at least two different data transfer modes.

18. The audio codec controller of claim 17, wherein said data buffer is arranged for buffering groups of audio data samples, the number of audio data samples in each group corresponding to the number of supported audio channels.

19. The audio codec controller of claim 16, wherein said data transfer modes include a 2-channel data transfer mode, a 4-channel data transfer mode, and a 6-channel data transfer mode.

20. The audio codec controller of claim 15, wherein said data transfer modes differ in the supported transfer rates.

21. The audio codec controller of claim 20, wherein said data transfer modes include a full-rate mode and a half-rate mode.

22. The audio codec controller of claim 20, wherein said data transfer to said audio codec includes the transfer of frames, and the supported transfer rates differ in the number of frames used to transfer the audio data relating to one audio sample.

23. The audio codec controller of claim 14, wherein said at least two different operational modes are sampling modes.

24. The audio codec controller of claim 1, wherein said data buffer is a first-in-first-out buffer.

25. The audio codec controller of claim 24, wherein said first-in-first-out buffer is arranged for buffering audio data samples having a width of one word.

26. The audio codec controller of claim 25, wherein said first-in-first-out buffer is arranged for being accessed in a double word manner.

27. The audio codec controller of claim 24, wherein said data transfer to said audio codec is a multi-channel data transfer, and said first-in-first-out buffer comprises a plurality of buffer units each configured to buffer data relating to one individual channel.

28. The audio codec controller of claim 1, further comprising:

a data buffer controller configured to control said data buffer to buffer data received from said second interface unit.

29. The audio codec controller of claim 28, wherein said data buffer is a first-in-first-out buffer.

30. The audio codec controller of claim 28, further comprising:

a second data buffer configured to buffer data received from said audio codec via said first interface unit, wherein said data buffer controller is further arranged for controlling said second data buffer to buffer data received from said first interface unit.

31. The audio codec controller of claim 28, wherein said data buffer controller is configured to check for an underrun condition of said data buffer and control said data buffer to be refilled if said underrun condition is fulfilled.

32. The audio codec controller of claim 1, being connectable to said external memory via a data bus, wherein said second interface unit is configured to act as bus master controller.

33. The audio codec controller of claim 1, wherein said first interface unit is arranged for performing data transfer to and from two audio codecs.

34. The audio codec controller of claim 33, wherein the data transfers from both audio codecs include frames having time slots, with the time slots of the audio data transfer from one of said audio codecs and the time slots of the audio data transfer from the other one of said audio codecs being orthogonal.

35. The audio codec controller of claim 1, wherein said data transfer to and from said audio codec includes the transfer of frames having time slots for transferring audio sample data, and the length of said time slots is greater than the length of said audio sample data.

36. The audio codec controller of claim 35, wherein said audio sample data is transferred in the most significant bits within said time slots.

37. The audio codec controller of claim 1, being an AC (Audio Codec) '97 compliant digital controller.

38. The audio codec controller of claim 1, wherein the sample order in which audio samples are received by the first interface from the capture register is dependent upon a channel configuration.

39. An audio codec control method comprising:

performing data transfer to and from an audio codec;

performing data transfer from an external memory;

receiving audio samples from the external memory;

buffering the received audio samples in a data buffer;

temporarily storing buffered audio samples in a capture register in accordance with a request from an audio codec; and transferring temporarily stored audio samples from said capture register to said audio codec independent of an operation of said data buffer in a sample order different from that of which audio samples were received from the external memory, wherein transferring audio samples from said capture register in a different order from that of which audio samples were received from the external memory includes a first audio sample being received from the external memory prior to a second audio sample being received from the external memory and the second audio sample being transferred from the capture register prior to transferring the first audio sample from the capture register.

40. The method of claim 39, wherein said step of transferring the temporarily stored audio samples comprises:

accessing said capture register at least twice without requiring said data buffer to be refilled from said external memory.

41. The method of claim 40, wherein said step of transferring audio samples to said audio codec includes the transfer of frames, and said step of accessing said capture register at least twice comprises:

transferring the temporarily stored audio samples to said audio codec in at least two frames.

42. The method of claim 39, wherein the data transfer to said audio codec is a packet oriented data transfer while the data transfer from said external memory is an audio sample oriented data transfer.

43. The method of claim 39, wherein said data transfer to said audio codec is a multi-channel audio data transfer.

44. The method of claim 43, wherein said multi-channel audio data transfer includes data transfer relating to a left-front channel and a right-front channel.

45. The method of claim 43, wherein said multi-channel audio data transfer includes data transfer relating to a left-rear channel and a right-rear channel.

46. The method of claim 43, wherein said multi-channel audio data transfer includes data transfer relating to a center-front channel.

47. The method of claim 43, wherein said multi-channel audio data transfer includes data transfer relating to a sub-woofer channel.

48. The method of claim 43, wherein said multi-channel audio data transfer is a 2-channel data transfer relating to a left-front channel and a right-front channel.

49. The method of claim 43, wherein said multi-channel audio data transfer is a 4-channel data transfer relating to a left-front channel, a right-front channel, a left-rear channel, and a right-rear channel.

50. The method of claim 43, wherein said multi-channel audio data transfer is a 6-channel data transfer relating to a left-front channel, a right-front channel, a left-rear channel, a right-rear channel, a center-front channel, and a subwoofer channel.

51. The method of claim 43, wherein said multi-channel audio data transfer includes the transfer of frames having time slots, and each channel is assigned one of said time slots.

52. The method of claim 39, wherein said step of transferring data to said audio codec is performed in accordance with one of at least two different data transfer modes.

53. The method of claim 52, wherein said data transfer modes differ in the number of supported audio channels.

54. The method of claim 53, wherein said step of buffering the received data in said data buffer comprises:

applying one of at least two different data buffer configurations, wherein each configuration relates to one of said at least two different data transfer modes.

55. The method of claim 54, wherein said step of applying the data buffer configurations comprises:

buffering groups of audio data samples, wherein the number of audio data samples in each group corresponds to the number of supported audio channels.

56. The method of claim 53, wherein said data transfer modes include a 2-channel data transfer mode, a 4-channel data transfer mode, and a 6-channel data transfer mode.

57. The method of claim 39, wherein said step of transferring data to said audio codec is performed in accordance with one of at least two different transfer rates modes.

58. The method of claim 57, wherein said transfer rates modes include a full-rate mode and a half-rate mode.

59. The method of claim 57, wherein said data transfer to said audio codec includes the transfer of frames, and the at least two different transfer rates modes differ in the number of frames used to transfer the audio data relating to one audio sample.

60. The method of claim 39, wherein said data transfer to said audio codec is a multi-channel data transfer, and said step of buffering the received data in said data buffer comprises:

buffering data relating to each individual channel in a separate one of a plurality of first-in-first-out buffer units of said data buffer.

61. The method of claim 60, wherein said step of buffering the received data in said data buffer comprises:

accessing said data buffer in a double word manner.

62. The method of claim 39, wherein the buffered data are audio data samples having a width of one word.

63. The method of claim 39, further comprising:

controlling said data buffer to check an underrun condition of said data buffer and refill said data buffer if said underrun condition is fulfilled.

64. The method of claim 39, arranged for performing data transfer to and from two audio codecs, wherein the data transfers from both audio codecs include frames having time slots, with the time slots of the audio data transfer from one of said audio codecs and the time slots of the audio data transfer from the other one of said audio codecs being orthogonal.

65. The method of claim 39, wherein the data transfer to and from said audio codec includes the transfer of frames having time slots for transferring audio sample data, and the length of said time slots is greater than the length of said audio sample data.

66. The method of claim 65, wherein said audio sample data is transferred in the most significant bits within said time slots.

67. The method of claim 39, for controlling AC (Audio Codec) '97 compliant audio codecs.

68. The method as recited in claim 39, wherein the sample order in which audio samples are transferred from the capture register is dependent upon a channel configuration.

69. An integrated circuit chip having audio codec control functionality, the integrated circuit chip comprising:

first interface circuitry configured to perform data transfer to and from an audio codec;

second interface circuitry configured to perform data transfer from an external memory; and a data buffer configured to buffer audio samples received from said external memory via said second interface circuitry, wherein said integrated circuit chip further comprises:

a capture register coupled to receive from said data buffer audio samples requested by said audio codec, and configured to temporarily store the received audio samples, wherein said first interface circuitry is connected to receive temporarily stored data from said capture register in a sample order different from the order of the audio samples received from the external memory, wherein the second interface circuitry is configured to transfer a first audio sample to the capture register and to subsequently transfer a second audio sample to the capture register, and wherein the first interface circuitry is configured to receive the second audio sample from the capture register and to subsequently receive the first audio sample from the capture register.

* * * * *